(12) United States Patent
Rinderer et al.

(10) Patent No.: US 9,776,774 B2
(45) Date of Patent: Oct. 3, 2017

(54) CONTAINER LID AND CONTAINER, AND METHOD FOR PRODUCING A CONTAINER LID

(75) Inventors: Matthias Rinderer, Fuschl am See (AT); Roland Concin, Stallehr (AT)

(73) Assignee: Red Bull GmbH, Fuschl Am See (AT)

( * ) Notice: Subject to any disclaimer, the term of this patent is extended or adjusted under 35 U.S.C. 154(b) by 30 days.

(21) Appl. No.: 14/237,866

(22) PCT Filed: Aug. 9, 2012

(86) PCT No.: PCT/EP2012/003406
§ 371 (c)(1),
(2), (4) Date: Apr. 2, 2014

(87) PCT Pub. No.: WO2013/020706
PCT Pub. Date: Feb. 14, 2013

(65) Prior Publication Data
US 2014/0231432 A1    Aug. 21, 2014

(30) Foreign Application Priority Data
Aug. 10, 2011    (EP) .................................... 11006575

(51) Int. Cl.
*B65D 17/00*    (2006.01)
*B65D 41/32*    (2006.01)
(Continued)

(52) U.S. Cl.
CPC .............. *B65D 43/26* (2013.01); *B29C 43/18* (2013.01); *B65D 17/165* (2013.01);
(Continued)

(58) Field of Classification Search
CPC .......... B65D 17/165; B65D 2517/0014; B65D 2517/0047; B65D 2517/0056;
(Continued)

(56) References Cited

U.S. PATENT DOCUMENTS 3,425,591 A * 2/1969 Pugh, Sr. ....................... 220/270
3,453,877 A    7/1969 Anderson
(Continued)

FOREIGN PATENT DOCUMENTS

DE    28 42 449 C2    2/1986
DE    100 18 685 C2    6/2003
(Continued)

OTHER PUBLICATIONS

International Search Report dated Apr. 12, 2012, in International Patent Application No. PCT/EP2012/003406, filed Aug. 9, 2012, 6 pages.

*Primary Examiner* — Fenn C Mathew
*Assistant Examiner* — Andrew T Kirsch
(74) *Attorney, Agent, or Firm* — Seed IP Law Group LLP

(57) ABSTRACT

The present disclosure relates to a container lid, comprising a lid surface having an area for an outlet opening that is defined by a circumferential edge, a lifting tab for opening the area, said lifting tab being fastened to a top side of the lid surface by a fastening means, possibly in the form of a rivet. The lid surface has a first locking element protruding from the lid surface or protruding into the lid surface, wherein the lifting tab has a second locking element that interacts with the first locking element such that a rotation of the lifting tab about the fastening means is prevented. The fastening means is configured to interact with element and/or the second locking element such that a rotation of the fastening means is prevented. The disclosure further comprises a container and a method for producing a container lid.

18 Claims, 3 Drawing Sheets

(51) Int. Cl.
  *B65D 17/34*  (2006.01)
  *B21D 51/38*  (2006.01)
  *B65D 43/26*  (2006.01)
  *B29C 43/18*  (2006.01)

(52) U.S. Cl.
  CPC .............. *B29C 2043/189* (2013.01);
          *B65D 2517/0014* (2013.01);
          *B65D 2517/0071* (2013.01);
          *B65D 2517/0079* (2013.01)

(58) Field of Classification Search
  CPC .... B65D 2517/0071; B65D 2517/0077; B65D 2517/0089; B65D 2517/5091; B65D 17/163; B21D 51/38; B21D 51/383
  USPC .................................................. 220/266, 269
  See application file for complete search history.

(56) References Cited

U.S. PATENT DOCUMENTS

| | | | |
|---|---|---|---|
| 3,606,076 A * | 9/1971 | Hanke et al. | 220/273 |
| 3,715,051 A * | 2/1973 | Hanke | 220/273 |
| 3,780,902 A * | 12/1973 | Holc | B65D 17/163 220/270 |
| 4,148,410 A | 4/1979 | Brown | |
| 4,363,419 A * | 12/1982 | Walz, Sr. | 220/269 |
| 4,596,342 A * | 6/1986 | Zysset | 220/273 |
| 5,129,541 A * | 7/1992 | Voigt | B65D 17/165 220/269 |
| 7,677,404 B2 * | 3/2010 | McEldowney et al. | 220/269 |
| 2002/0088804 A1 | 7/2002 | Omura | |

FOREIGN PATENT DOCUMENTS

| | | |
|---|---|---|
| DE | 103 00 914 A1 | 7/2004 |
| DE | 60 2005 002 878 T2 | 7/2008 |
| EP | 0 564 725 A1 | 10/1993 |
| GB | 1106828 A | 3/1968 |
| GB | 1 422 648 A | 1/1976 |
| GB | 1 534 703 A | 12/1978 |
| GB | 2 379 917 A | 3/2003 |
| JP | 7-275976 A | 10/1995 |
| JP | 8-53131 A | 2/1996 |
| JP | 9-226762 A | 9/1997 |
| JP | 2006-176142 A | 7/2006 |
| WO | 97/30902 A1 | 8/1997 |
| WO | 98/33715 A1 | 8/1998 |
| WO | 2005/056400 A1 | 6/2005 |

* cited by examiner

CONTAINER LID AND CONTAINER, AND METHOD FOR PRODUCING A CONTAINER LID

FIELD

This present disclosure relates to a container lid, a container, such as a beverage can including said container lid, and a method for producing a container lid.

BACKGROUND

Single-use containers for liquids have been used in the most varied shapes and sizes for a long time. Beverage cans made of light metal with a lid that is equipped with a lifting tab closure are particularly common. According to a first embodiment, the area or portion of the lid that forms the outlet opening is pushed into the can when the lever or lifting tab is operated and remains captively connected to the can top. According to another embodiment, this tab is removed together with the area or portion of the lid that forms the outlet opening when the lifting tab is operated. Such closing systems are described, for example, in WO 97/030902, DE 100 18 685 C2, U.S. Pat. No. 4,148,410, EP 564 725 A1, WO 2005/056400 A1, and GB 2 379 917 A.

The lever or lifting tab on such containers can be rotated around a fastening means, frequently a rivet, that is connected to the lid surface in a central position. The lifting tab overlaps at its first end an area of the lid surface that covers the outlet opening. The outlet opening is opened when the lifting tab is lifted at the opposite second end and the first end exerts a force on said area. Since the first end of the lifting tab only has a minor overlap with the area of the lid surface that covers the outlet opening and that is often defined by a tear profile, it is typically necessary to open the can with an ideally aligned lifting tab, i.e., from its opening position. Otherwise, the lifting tab may break off or bend, and the beverage can can no longer be opened.

To solve this problem, U.S. Pat. No. 3,453,877 proposed to provide an elevation in the lid surface between the rivet for the lifting tab and the area of the outlet opening that is to engage a corresponding hole in the lifting tab. GB 1 106 828 proposes the same approach. Small apertures in the region of the lifting tab are meant to interact with corresponding protrusions for this purpose.

JP 07 275976 A also provides a protrusion next to the rivet in the lid surface that is to engage a corresponding hole in the lifting tab.

According to DE 10 300 914 A1, turning of the lifting tab is prevented by strip-shaped protrusions from the lid surface in the form of beads, which are intended to limit the edge of the opening tab and hold it when not in use.

GB 1 534 703 discloses a lifting tab having a pull ring that is prevented from rotating freely about the rivet by two protrusions attached to the inner side of this ring. The device for holding the lifting tab in position according to GB 1 422 648 merely differs from that disclosed in GB 1 534 703 in that the protrusions are not disposed on the inner edge but on the outer edge of the lifting tab to help prevent its rotation out of position.

According to DE 60 2005 002 878 T2, twisting of the lifting or opening tab can only be effectively prevented by attaching a removable adhesive tape, which at the same time covers a ventilation hole.

According to DE 28 42 449, a protrusion of the opening tab is pressed against the lid surface for pretensioning. This is to prevent a pivoting movement of the opening tab.

JP 8 053 131 A proposes a pin that projects from a can lid and is to help keep a lifting tab in its position through an opening. U.S. Pre-Grant Publication No. 2002/0088804 A1 discloses a comparable solution, wherein a so-called support is used for additional locking to prevent the lifting tab from rotating.

JP 9 226762 A proposes a protrusion from the lid surface that is to engage a corresponding hole in the tongue of the lifting tab for locking the lifting tab in place. WO 98/33715 A1 proposes a similar solution.

JP 2006 176142 A finally proposes a rivet with projections to prevent it from rotating.

The lid variants known from prior art all have disadvantages and leave room for improvement. For example, users or customers can still operate the tabs incorrectly.

SUMMARY AND INITIAL DESCRIPTION

Described herein is a container lid that is free from disadvantages of the prior art and that, in particular, allows simple and reliable operation of a lever or lifting tab that excludes improper operation without requiring a complex design of manufacturing steps and/or components.

In at least one embodiment, a container lid comprises a lid surface with a top side and a bottom side, a circumferential edge, and an area for an outlet opening. The outlet opening may include a notched metal sheet and at least one fully or partially circumferential tear profile that may be a notched profile. A lifting tab is attached to the top side of the lid surface via a fastening means, possibly in the form of a rivet provided in the center of the lid surface (10), for at least partially opening the area, thus forming the outlet opening. The lifting tab is provided with a first end section and an opposite second end section that can be moved about the fastening means into an opening position or is provided in the opening position. The first end section, particularly in the opening position of the lifting tab, can be brought into at least a partial overlap with, or is at least partially overlapping, a portion of the area for the outlet opening. The second end section is provided at a first spacing from the top side of the lid surface beyond the fastening means relative to the first end section, which spacing however is not sufficient for the lifting tab to apply a force to the area via the first end section to initiate the formation of the outlet opening. The lid surface comprises at least one first locking element protruding from the lid surface and/or projecting into the lid surface, wherein the lifting tab comprises at least one second locking element, that, particularly in the opening position, interacts with the first locking element such that pivoting of the lifting tab about the fastening means, particularly from the opening position, can be or is prevented even if the second end section is moved into a second spacing from the lid surface that is greater than the first spacing. The first and second locking elements extend from the fastening means towards the second end section of the lifting tab, if the latter is in the opening position, wherein the first locking element(s) extend(s) towards the edge, particularly in the radial direction. The fastening means is configured to interact with the at least one first locking element and/or the at least one second locking element in such a way that pivoting of the fastening means can be or is prevented.

In a particularly useful embodiment, the fastening means is formed as an integral part of the lid surface on the top side of said lid surface. The fastening means may also be incorporated into the lid surface in one piece. Incorporating the fastening means into the lid surface eliminates the risk of leakage in the lid section.

In some embodiments, it is preferred that the interaction of the first and second locking elements is such that the first and the second locking elements are matched in shape and/or size to engage one another, particularly in the opening position, to prevent pivoting of the lifting tab about the fastening means, particularly from the opening position.

In a particularly useful embodiment, the lifting tab includes a holding element, such as a holding tongue, preferably made of metal, that holds the lifting tab to the lid surface using the fastening means, particularly adjacent to the first end section of the lifting tab. It is particularly preferred that the one or two locking element(s) is/are provided in the holding element or holding tongue.

In a particularly suitable embodiment, the second locking elements represent or include indentations towards the lid surface that engage matching first locking elements shaped as indentations towards the bottom side of the lid surface, particularly in the opening position, and/or the second and the first locking elements extend in a direction away from the area, particularly from the fastening means.

In at least one embodiment, the container lid is characterized in that the lifting tab, particularly the holding element, comprises at least two, three, or four second locking elements and/or the lid surface comprises at least two, three, or four first locking elements, wherein the at least two, three, or four first and second locking elements match with respect to their position and optionally their shape and/or size, and preferably are in engagement.

The first and/or second locking elements may be disposed adjacent to the fastening means.

It is appropriate that the first and/or second locking elements are provided in the region of, such as between, the fastening means and the second end section of the lifting tab.

In at least one embodiment, the first and/or second locking elements have a geometric shape in top view, such as a line, triangle, rectangle, trapezoid, parallelogram, square, circle, or ellipse.

In at least one variant, the container lid is a beverage can lid.

The circumferential edge of the lid surface of the container lid may also include a flange.

Furthermore, the area for the outlet opening may be a notched metal sheet, or the tear profile may represent a notched profile.

It is preferred in this context, for example, that the tear profile surrounds the area for the outlet opening up to a distance adjacent to the first end section in the opening position and offset to the side in relation to a line formed by the fastening means and the first end section in the opening position.

The fastening means for attaching the lifting tab to the lid surface is often disposed at the center of said lid surface. The fastening means includes, but is not limited to, a rivet.

Furthermore, container lids that are particularly suitable include a bead on the top side of the lid surface that fully or partially surrounds the area for the outlet opening, particularly adjacent to it. The area for the outlet opening may be spaced apart from the fastening means and, in particular, be adjacent to the edge of the lid surface.

The container lid according to the invention may be fully or partially made of metal and/or plastic.

The circumferential edge may comprise an axial extension from the top side of the lid surface. It is advantageous in this respect that the size of said extension is greater than the size of the axial extension of the lifting tab relative to the lid surface in the opening position when the area for the outlet opening is still intact.

In another embodiment, the first locking element(s), particularly two or three first locking elements, extend(s) radially towards the edge, particularly from the fastening means, particularly in the longitudinal dimension. It is also particularly useful that the fastening means, particularly when forming an integral part of the lid surface on the top side of said lid surface, is designed as a rivet with respect to its shape and size such that it interacts with at least one first locking element and at least one second locking element, particularly engages it or them, so that any pivoting of the fastening means can be or is prevented.

The design of the fastening means allows a particularly reliable and secure fixation of the position of the lifting tab in the desired opening position that can no longer be manipulated and ensures that the container is always opened from the opening position, i.e., with the lifting tab in an optimum orientation.

In a particularly useful embodiment, the fastening means may be or include a rivet extending towards the edge of the container lid, particularly in longitudinal dimension, and engages a matching first locking element and a matching second locking element while at the same time said first and second locking elements engage one another. Further developments in which at least one further first locking element engages at least one further second locking element without engagement of the fastening means with said further first and second locking elements have proved to be of particularly good quality in terms of resistance to torsion.

In this context, such container lids are preferred in which the fastening means, the first locking element, and the second locking element have been obtained by compression molding a blank of the fastening means, which is an integral part of the lid surface, with a section of the lid surface forming the first locking element and a section of the lifting tab forming the second locking element, particularly while in mutual engagement.

Also disclosed herein is a container comprising a container body and a container lid joined with it in a fluid-tight manner. Such a container may, for example, be a beverage can.

Further disclosed herein is a method for producing a container lid for a container, such as a beverage can. In at least one embodiment, such a method includes the following steps:

Providing a lid surface having a top side and a bottom side, having a circumferential edge, with an area for an outlet opening, wherein the outlet opening includes at least one fully or partially circumferential tear profile, and with a blank of a fastening means in the form of a rivet blank on its top side as an integral, e.g., one-piece, part of the lid surface;

Providing a lifting tab with an aperture for the blank of the fastening means;

Inserting the lid surface in a first compression molding die;

Placing the lifting tab at or onto the lid surface such that the blank of the fastening means extends through the aperture;

Optionally positioning the lid surface and/or lifting tab; and

Compression molding of the lid surface, including the blank of the fastening means, and the lifting tab, thus forming a rivet containing a rivet head whose dimension substantially parallel to the lid surface is greater than the aperture of the lifting tab, and forming at least one first locking element protruding from the lid surface and/or projecting into the lid surface and at least one second locking element protruding from the lid surface and/or projecting into the lid surface such that at least one first locking element and at least one second locking element engage one another, thereby making pivoting of the lifting tab about the rivet difficult or preventing it.

In a particularly useful embodiment, the rivet, particularly the rivet head, is at least partially brought into engagement with the at least one first locking element and the at least one second locking element in the process of forming the first or second locking element, respectively, in the compression molding process.

In another embodiment, at least one further first locking element is brought into engagement with at least one further second locking element in the compression molding process.

The rivet or rivet head, respectively, is regularly molded such that it has a diameter that is greater than the diameter of the aperture in the lifting tab and therefore covers the latter and extends beyond the latter, at least partially or, in particular, completely.

The present disclosure is based on the surprising finding that container lids according to the invention are able, for the first time, to ensure reliable opening of container systems, such as, beverage cans. Complaints due to incorrect operation can be eliminated. Any improper handling can basically be excluded. This ensures a very high level of customer satisfaction.

DESCRIPTION OF THE DRAWINGS

Other features and advantages of the invention can be derived from the description below, which explains preferred embodiments of the invention as examples with reference to schematic figures, wherein.

DETAILED DESCRIPTION

Figure 1:
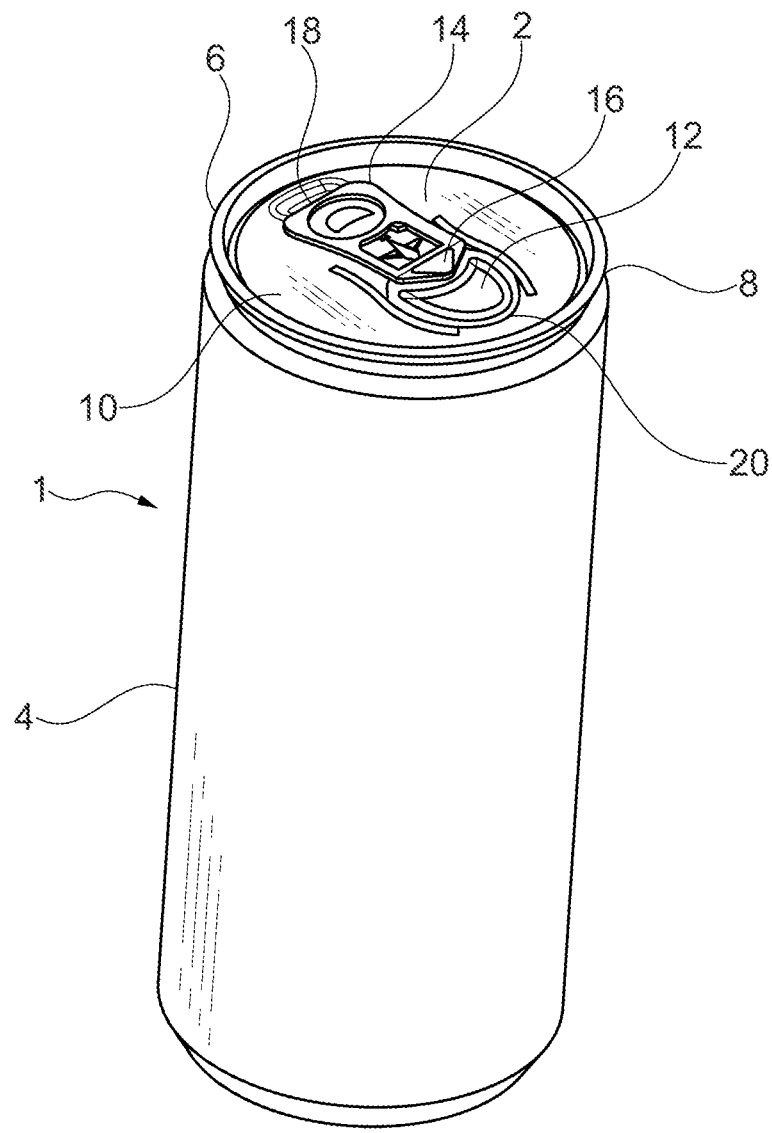
FIG. 1 is a perspective view from the top of a beverage can, including the container lid, according to the present disclosure.

FIG. 1 shows a container 1 according to at least one embodiment of the invention in the form of a beverage can with a container lid 2 and a container body 4. The container lid 2 comprises a circumferential edge 6 that is joined in a fluid-tight manner by a flange 8 with the container body 4. The container lid 2 is further equipped with a lid surface 10 comprising an area 12 for an outlet opening. The container lid 2 also comprises a lifting tab 14 with a first end section 16 in the form of a locking nose and an opposite second end section 18. The area 12 for the outlet opening is surrounded by a tear profile 20, except for a section 42 that prevents the opened lid surface area piece from falling into the container. A circumferential bead 22 is provided for mechanical reinforcement of the lid surface occupied by the area 12. A circumferential bead 25 is further provided adjacent to the area 12 for reinforcement of the outlet opening. The details mentioned above can also be derived from the container lid component according to FIG. 2. In the embodiment shown in the figures, the container lid 2 or the lid surface 10, respectively, are made of a light metal, such as aluminum.

The lifting tab 14 is shown in the so-called opening position in the embodiment shown in FIG. 1. This is the regular position of the lifting tab in which opening is always successful. This is because the first end section or locking nose 16 has an optimum overlap with the area 12 for the outlet opening in this opening position. When lifting the lifting tab 14 from the opening position, the locking nose 16 will, in most cases, still ensure optimal and even transmission of the force to the area 12. When pivoting the lifting tab 14 away from the opening position, there is no or just a marginal overlap with the area 12 for the outlet opening.

The lifting tab 14 is connected to the lid surface 10 via a fastening means 24 in the form of a rivet. In the embodiment shown, the fastening means 24 is dimensioned such that it engages the middle one of the three first locking elements 38 and (not shown) with the respective middle one of the three second locking elements 40 when the lifting tab 14 is attached to the lid surface 10. This ensures a particularly secure fixation of the lifting tab in its opening position.

The lifting tab 14 includes a gripping surface or gripping opening 28 in the region of the second end section 18, which allows easy operation of the lifting tab by simple gripping. An indentation 30 is provided in the embodiment of the container lid 2 shown in FIG. 2 for more convenient and reliable gripping of the end section 18 of the lifting tab 14. In this way, a user can easily grab or reach under the lifting tab in the end section 18 and lift it to open the area 12. The design also allows the second end section 18 of the lifting tab to be positioned very close to the edge 6, which makes container lids with a very small diameter feasible. The spacing of the lifting tab from the lid surface in the opening position can also be kept very small, e.g., to obtain a parallel orientation.

Figure 2:
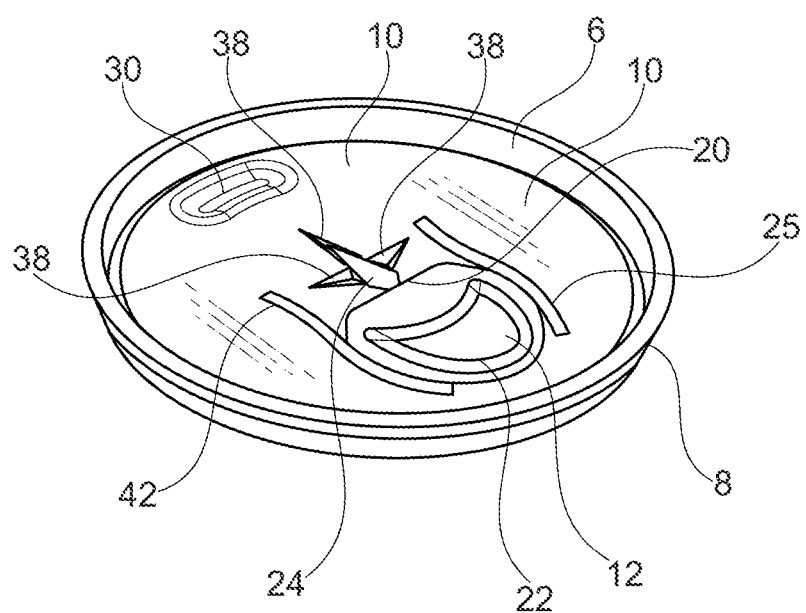
FIG. 2 is a perspective view of the container lid of the beverage can according to FIG. 1, shown without the lifting tab.
Figure 3:
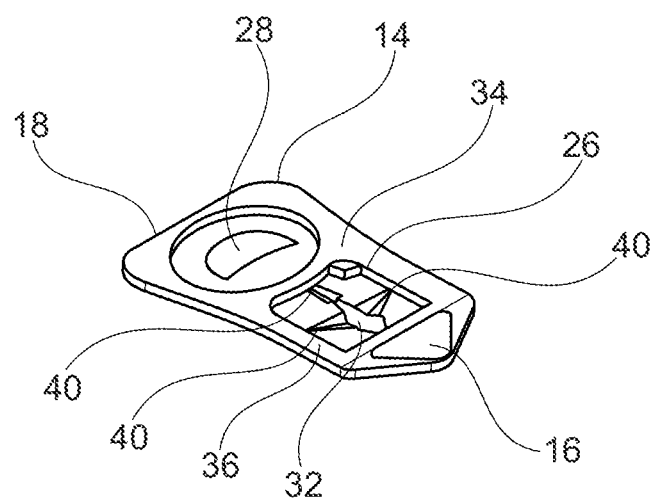
FIG. 3 is a schematic view of the lifting tab of the container lid of the beverage can, according to FIG. 1.

FIG. 2 further shows the fastening means 24 in the form of a rivet that extends radially towards the edge of the container lid and engages the middle one of the three first locking elements 38 of the lid surface 10. Not only the fastening means 24 in the form of a rivet, but also the first locking element 38, extends radially towards the edge. FIG. 2 does not show the lifting tab 14 that is attached to the lid surface 10 in a lid that is ready for use; said tab is shown in FIG. 3. The container lid as illustrated can be produced from the components shown in FIGS. 2 and 3 by first providing a container lid preform that has not yet been joined with the lifting tab and that includes a rivet blank that is a one-piece part of the lid surface. This rivet blank has a diameter that permits a lifting tab preform to be put or placed onto the lid through the opening 32. Like the preform of the container lid, the lifting tab preform does not yet comprise first or second locking elements. After placing the lifting tab preform onto the container lid preform through the opening 32, the rivet 24 and the first and second locking elements 38 and 40 can be molded, preferably in a single compression molding process.

The rivet or rivet head, respectively, is regularly molded such that it has a diameter that is greater than the diameter of the aperture in the lifting tab and therefore covers the latter and extends beyond the latter, partially or completely.

The compression molding process thus produces the engagement of the oblong rivet 24 with the middle one of the three second locking elements 40 and with the middle one of the three first locking elements 38. This engagement is already sufficient to prevent distortion of the lifting tab in the opening process. A particularly high level of safe operation is achieved in that the two outer first locking elements 38 and the two outer second locking elements 40 are also brought into mutual engagement in this compression molding process. This ensures particularly high resistance to distortion when operating the lifting tab according to a preferred embodiment.

The embodiment of the lifting tab 14 shown in FIG. 3 includes a holding tongue or web 26 that extends from the first end section 16 towards the second end section 18. This holding tongue 26 comprises a hole 32 for connecting to the fastening means 24 in the form of a rivet. The holding tongue 26 is only connected to the other components of the lifting tab 14 in the direction of the first end section 16 and is encompassed by the surrounding holding webs 34 and 36 that extend from the first end section 16 towards the second end section 18 or the handle 28, respectively. When lifting the second end section 18, the lifting tab 14 can be lifted up from its substantially parallel orientation relative to the lid surface 10 that it has in the opening position. The holding tongue 26 is attached to the rivet 24 and therefore remains snug with the lid surface 10 or in substantially parallel alignment with said lid surface.

The first locking elements 38, shown in the form of indentations or notches in the lid surface 10, are provided adjacent to the fastening means or rivet 24 or extend from the fastening means 24. In the embodiment shown, these notches 38 are of a substantially linear design and extend radially from the fastening means 24 towards the edge 6. The second locking elements 40, shown in the form of indentations that are matched with said notches 38, are provided in the lifting tab 14 or holding tongue 26, respectively. When attaching the lifting tab 14 to the lid surface 10 using the fastening means 24 in the form of a rivet, the second locking elements 40 in the form of indentations are sunk into the first locking elements 38 in the form of indentations, which correspond in shape and size. After attaching the fastening means 24, the lifting tab 14 is in the opening position, i.e., in optimum alignment with the area 12 for an outlet opening to constantly ensure flawless opening when operating the lifting tab. The lifting tab 14 can no longer be pivoted about the fastening means 24, even if the second end section 18 of the lifting tab 14 is lifted.

The features of the invention disclosed in the above description, the claims and the figures can be relevant both individually and in combination for implementing the various embodiments of the invention.

The invention claimed is:

1. A container lid, comprising:
  a lid surface with
    a top side and a bottom side,
    a circumferential edge, and
    an area for an outlet opening,
      wherein the outlet opening includes at least one fully or partially circumferential tear profile; and
  a lifting tab for at least partially opening the area, thus forming the outlet opening,
    wherein the lifting tab is attached, via a rivet, to the top side of the lid surface outside the area for the outlet opening, wherein the rivet is an integral part of the lid surface on the top side of said lid surface, and
    wherein the lifting tab has a first end section and an opposite second end section that is provided in an opening position,
    wherein the first end section, in the opening position of the lifting tab, can be brought into at least a partial overlap with, or is at least partially overlapping, a portion of the area for the outlet opening, and
    wherein the second end section is provided at a first spacing from the top side of the lid surface beyond the rivet relative to the first end section, which first spacing is not sufficient for the lifting tab to apply a force to the area via the first end section to initiate the formation of the outlet opening,
    wherein the lid surface further comprises at least one first locking element, separate from the rivet, protruding from the top side of the lid surface or projecting from the top side of the lid surface inward into the lid surface,
    wherein the lifting tab further comprises at least one second locking element, separate from the rivet, that interacts with the at least one first locking element such that pivoting of the lifting tab about the rivet can be or is prevented even if the second end section is moved into a second spacing from the lid surface that is greater than the first spacing,
    wherein the at least one first locking element and the at least one second locking element extend from the rivet in a direction towards the second end section of the lifting tab when the second end section is in the opening position,
    wherein the at least one first locking element extends in a direction towards the edge in a radial direction,
    wherein the rivet is configured to engage the at least one first locking element in such a way that pivoting around the rivet can be or is prevented,
    wherein said at least one first locking element and said at least one second locking element concurrently engage one another,
    wherein the lifting tab further includes a holding tongue adjacent to the first end section of the lifting tab,
      wherein the holding tongue holds the lifting tab to the lid surface using the rivet, and
      wherein the at least one second locking element is provided in the holding tongue,
    wherein interaction of the at least one first locking element and the at least one second locking element is such that the at least one first and the at least one second locking elements are matched in shape to engage one another to prevent pivoting of the lifting tab about the rivet, and
    wherein the rivet extends towards the circumferential edge of the container lid in a longitudinal dimension, and engages the at least one first locking element while at the same time the at least one first locking element and the at least one second locking element engage one another.

2. The container lid according to claim 1, wherein the interaction of the at least one first locking element and the at least one second locking element is such that the first and the second locking elements are further matched in size to engage one another to prevent pivoting of the lifting tab about the rivet.

3. The container lid according to claim 1, wherein the at least one second locking element includes one or more indentations towards the lid surface that engage a matching first locking element shaped as one or more indentations towards the bottom side of the lid surface.

4. The container lid according to claim 1, wherein the lifting tab comprises at least two, three, or four second locking elements and/or the lid surface comprises at least two, three, or four first locking elements, wherein the at least two, three, or four first and second locking elements match with respect to their position, their shape, and/or size.

5. The container lid according to claim 1, wherein the at least one first locking element and/or the at least one second locking element is provided in a region of the rivet and the second end section of the lifting tab.

6. The container lid according to claim 1, wherein the container lid is configured for a beverage can.

7. The container lid according to claim 1, wherein two or three first locking elements extend radially from the rivet towards the circumferential edge in a longitudinal dimension.

8. The container lid according to claim 1, wherein the rivet engages the at least one first locking element and the at least one second locking element so that pivoting of the rivet can be or is prevented.

9. The container lid according to claim 1, wherein the rivet extends towards the circumferential edge of the container lid in a longitudinal dimension, and further engages the at least one second locking element while at the same time the at least one first locking element and the at least one second locking element engage one another.

10. The container lid according to claim 9, wherein at least one further first locking element engages at least one further second locking element without engagement of the rivet with said further first and second locking elements.

11. The container lid according to claim 1, wherein the rivet, the at least one first locking element, and the at least one second locking element have been obtained by compression molding a blank of the rivet, which is an integral part of the lid surface, with a section of the lid surface forming the at least one first locking element and a section of the lifting tab forming the at least one second locking element—while in mutual engagement.

12. A container comprising a container body and a container lid according to claim 1 joined with the container body in a fluid-tight manner.

13. A method for producing a container lid according to claim 1, comprising:
providing the lid surface having a top side, a bottom side and a circumferential edge, with the area for an outlet opening, wherein the outlet opening includes at least one fully or partially circumferential tear profile, and with a rivet blank on the top side of the lid surface as an integral part of the lid surface;
providing the lifting tab with an aperture for the rivet blank;
inserting the lid surface in a first compression molding die;
placing the lifting tab at or onto the lid surface such that the rivet blank extends through the aperture; and
compression molding of the lid surface, including the rivet blank and the lifting tab, thus forming the rivet containing a rivet head whose dimension substantially parallel to the lid surface is greater than the aperture of the lifting tab, said compression molding also forming the at least one first locking element, separate from the rivet, protruding from the top side of the lid surface or projecting from the top side of the lid surface inward into the lid surface, and at the least one second locking element, separate from the rivet, provided in the lifting tab or the holding tongue of the lifting tab, such that the rivet, the at least one first locking element, and the at least one second locking element engage one another, thereby making pivoting of the lifting tab about the rivet difficult or preventing such pivoting.

14. The method according to claim 13, wherein the rivet head is at least partially brought into engagement with the at least one first locking element and the at least one second locking element in the process of forming the first or second locking element, respectively, in the compression molding process.

15. The method according to claim 14, wherein at least one further first locking element is brought into engagement with at least one further second locking element in the compression molding process.

16. The container lid according to claim 1, wherein the at least one second locking element interacts with the at least one first locking element when the lifting tab is in the opening position.

17. The container lid according to claim 1, wherein the second locking element and the first locking element extend in a direction away from the area for the outlet opening and from the rivet.

18. The container lid according to claim 1, wherein the rivet is provided in the center of the lid surface.

* * * * *